United States Patent [19]

Kvame

[11] 4,430,947
[45] Feb. 14, 1984

[54] SHELF SUPPORT SYSTEM

[75] Inventor: Martin C. Kvame, Huron, Ohio

[73] Assignee: Displayco Midwest, Inc., a division of Schiffenhaus Packaging Corporation, Sandusky, Ohio

[21] Appl. No.: 249,438

[22] Filed: Mar. 31, 1981

[51] Int. Cl.³ .............................................. A47B 3/00
[52] U.S. Cl. ................................... 108/111; 108/108; 108/115; 312/258; 312/259
[58] Field of Search .............. 312/111, 259, 261, 330; 220/22.3, 22.2, 22.1, 22.5; 108/111, 59, 108, 115

[56] References Cited

U.S. PATENT DOCUMENTS

| | | | |
|---|---|---|---|
| 2,180,131 | 11/1939 | Zinser | 312/259 |
| 2,486,745 | 11/1949 | Harris | 312/259 X |
| 2,785,453 | 3/1957 | Wentz | 24/217 R |
| 3,576,355 | 4/1971 | Stone et al. | 312/259 X |
| 3,580,535 | 5/1971 | Naske | 248/239 |
| 3,680,177 | 8/1972 | Ginsberg | 312/330 R |
| 3,752,553 | 8/1973 | Bildahl | 312/330 |
| 3,759,600 | 9/1973 | MacDonald | 312/330 |
| 3,846,003 | 11/1974 | Rockwell | 312/330 X |
| 3,863,575 | 2/1975 | Kuns et al. | 108/111 |
| 4,220,305 | 9/1980 | Pollard | 248/245 |

Primary Examiner—James T. McCall
Attorney, Agent, or Firm—Lalos, Leeds, Keegan, Lett & Marsh

[57] ABSTRACT

A support system for shelving or the like comprising a first female element which is attached to the side wall or other wall of a display stand and a second male element which is attached to the sides or ends of shelving provide for the display stand. The support system elements are designed so that they may be snapped together when the display stand is assembled and slid apart when the display stand is disassembled.

26 Claims, 9 Drawing Figures

U.S. Patent  Feb. 14, 1984  Sheet 1 of 3  4,430,947
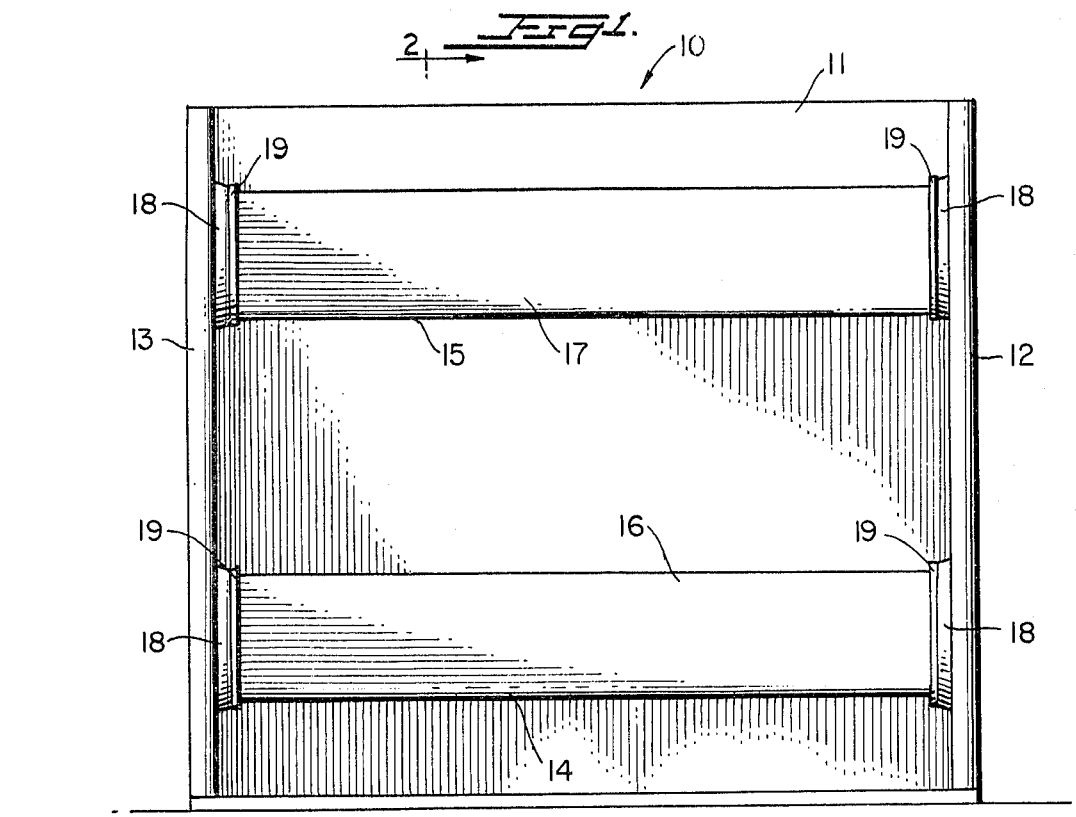
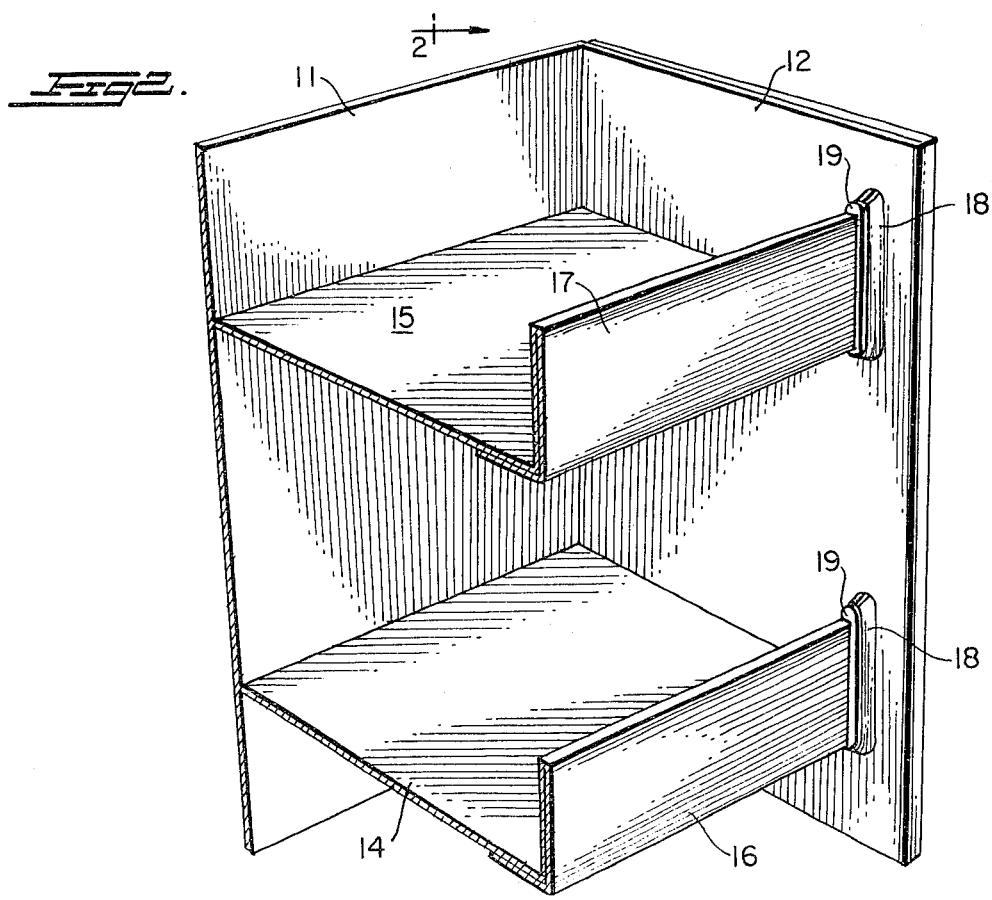

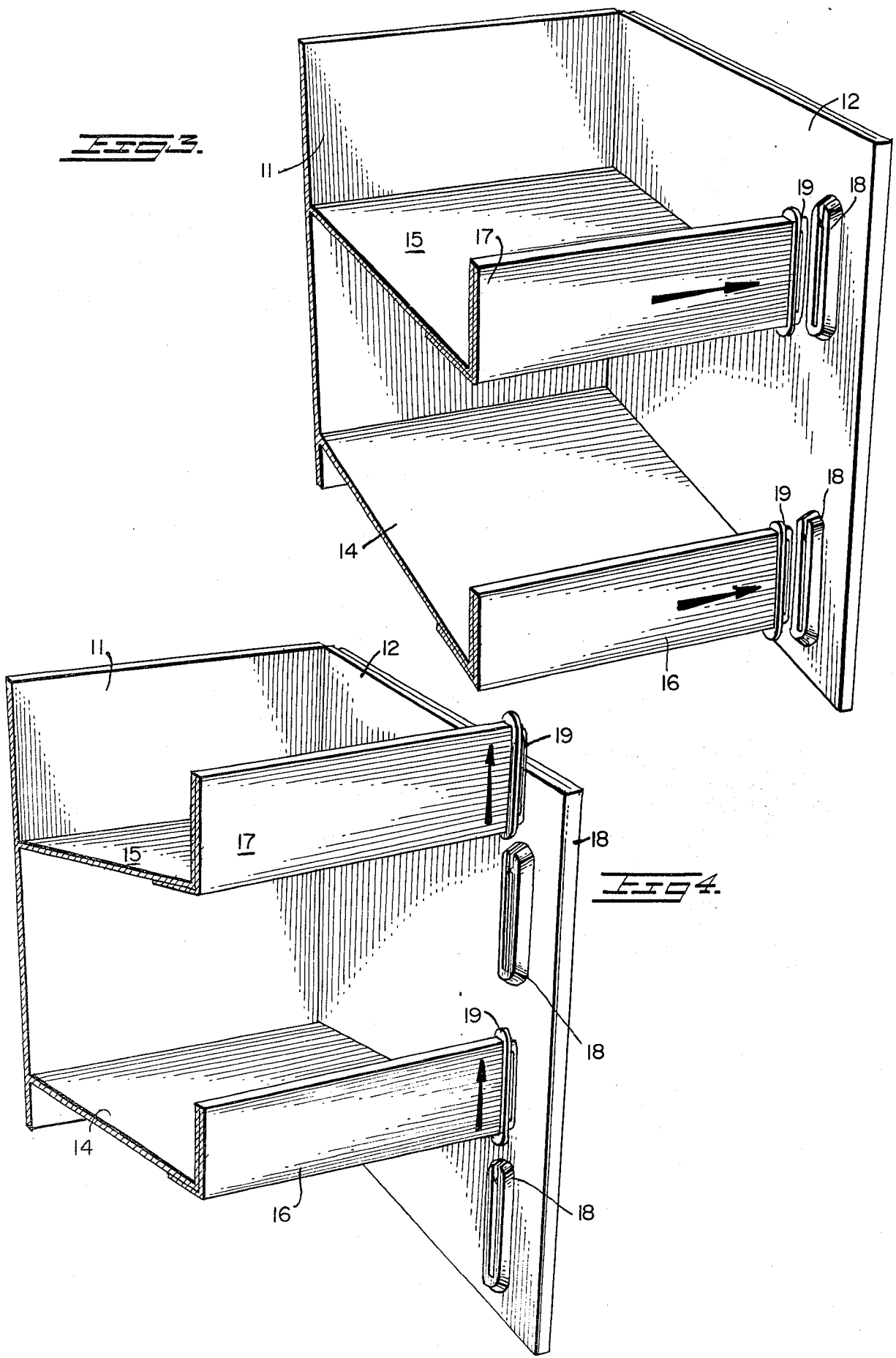

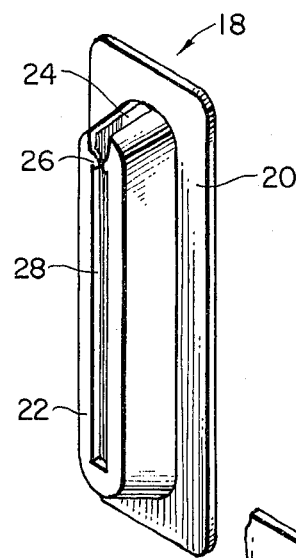
FIG 5.
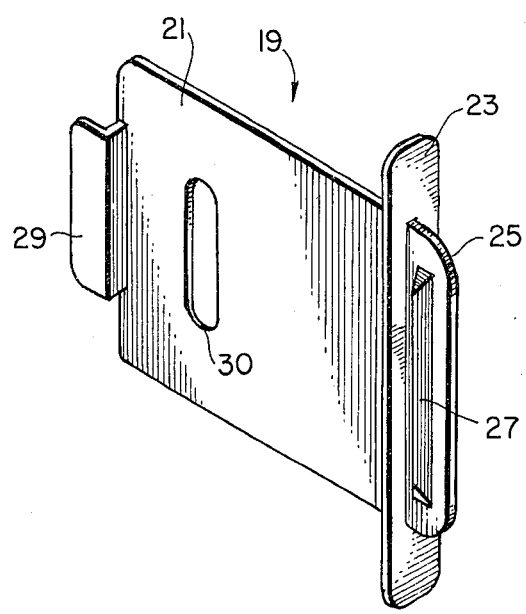
FIG 6.
FIG.6(a)
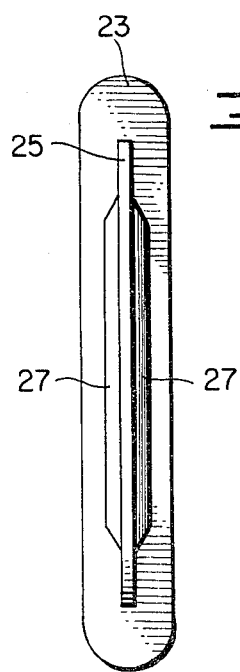
FIG 7.
FIG 8.

SHELF SUPPORT SYSTEM

BACKGROUND OF INVENTION

Shelving supports are well known in the art and take many different forms. Most such supports comprise load bearing members which are fixed to walls or the like and on which the shelves rest. Other such supports include means for attaching the load bearing members directly to the shelves for retaining the shelves in a fixed location. The latter type supports may include separable fasteners, one of which is attached to the wall while the other is attached to the shelf. In such a case, the separable fasteners together become load bearing members, the strength and convenience of which is determined by the method used for attaching the fasteners to their respective elements, and the design and ease with which the fasteners may be engaged or disengaged.

U.S. Pat. No. 4,220,305 shows a typical shelf support which includes a mounting strip attached to a wall or the like and a load bearing member which is positioned in the mounting strip for directly supporting a shelf. U.S. Pat. No. 3,580,535 illustrates another type of shelf connector wherein a first pin-type element is attached to a wall and a second, substantially inverted cup shaped element is associated with the shelf for connecting the shelf and wall together. In the latter patent the two elements slide together and apart with a pivoting action as desired for assembling and disassembling the shelves from their supports. U.S. Pat. No. 2,785,453 shows yet another separable fastener structure which may be used on shelving wherein the two fastener elements snap together and pull apart as desired in a typical back and forth operation. Lastly, U.S. Pat. No. 3,863,575 shows a typical display stand with integral shelves and one method for retaining the shelves in position.

In each of the cases described hereinbefore, the shelving connections have poor load bearing strength and reliability because of the manner in which they are affixed to their respective shelving components, and because of the manner in which they become engaged with one another. When such shelving connectors are applied to point-of-purchase display stands or the like, one of the tests used to determine the serviceability of the connectors is their resistance to separation when a loaded display stand is pulled or pushed from the side. Another consideration for such connectors is the ease with which the elements are engaged when the display stand is assembled. Obviously, when the display stand has a great width, and is to be assembled by one person, it is desireable to provide connections which may be made first at one side of the shelf and then at the other, rather than at both ends simultaneously. Thus, in order to satisfy the requirements of serviceability and ease of assembly, the shelf connector components of the present invention were designed to be conveniently snapped together for assembly and slid apart for disassembly.

SUMMARY OF INVENTION

The present invention is directed to a support system for shelving or the like comprising a pair of connector elements that snap together during assembly and slide apart for disassembly. The connector elements of the present invention may be conveniently used in display stands which include shelving or in any other environment where shelves or the like are used for storing or supporting goods. The shelf connectors of the present invention are particularly useful in a display stand having a plurality of shelves where it is desired to remove or fold the unused shelves out of the way when not in use. The latter feature is readily accomplished with the shelf connectors of the present invention since the elements snap together for assembly and slide apart for disassembly.

The shelf connectors comprise a first female element which is attached to or mounted in the side wall or other wall of a shelf assembly and a second male element which is attached to or mounted in the end or other edge of a shelf or the like. These members may be mounted either horizontally or vertically as desired. The female element comprises a base portion which is attached to or otherwise mounted behind one panel of the wall or the like and an upraised, elongated socket portion that extends beyond the wall and preferably protrudes through an opening provided therefor in the one panel of the wall. The upraised elongated socket portion of the female element is provided with an opening at one end which is integral with an elongated slot in the face thereof. The slot extends substantially the full length of the socket and terminates near the opposite end thereof to leave a lip portion.

The male shelf connector comprises a rectangular portion which is attached to or mounted within the several plies of the shelf edge, a guard portion arranged substantially perpendicular to the first portion which serves as a general guard element and an elongated, flat flange portion that is essentially an extension of the rectangular portion on the opposite side of the guard portion that ultimately becomes engaged within the slotted upraised portion of the female element. The rectangular portion of the male connector element includes means for securing it to or within the panels of the shelf part of the display stand or the like and the elongated flat flange portion includes a tapered section that serves to lock the male connector element within the slotted area of the female connector element. In yet another embodiment of the invention the male connector element may include hooked ends at each end of the elongated flat flange portion for engagement with the lip portion of the female connector element.

The male and female connector elements may be constructed from any durable material such as metal or plastic that can be readily integrated into the display unit and shelving components. The female element must comprise a limited degree of resiliency that is enhanced by the slotted opening provided therein in order to provide the desired snap together feature of the present invention. For this reason, the preferred connectors are constructed from materials such as polypropylene or styrene in an injection molding process. Obviously, however, other materials may be used to make the shelf connectors of the present invention as long as the desired operating criteria can be accomplished.

DESCRIPTION OF DRAWING

FIG. 1 is a front view of a typical display stand using the shelf support system of the present invention;

FIG. 2 is a partial perspective view in cross section of the display stand of FIG. 1;

FIG. 3 is a view similar to FIG. 2 showing how the shelf supports are engaged;

FIG. 4 is a view similar to FIG. 2 showing how the shelf supports are disengaged;

FIG. 5 is a perspective view of the female part of the shelf support system of the present invention;

FIG. 6 is a perspective view of the male part of the shelf support system of the present invention;

FIG. 6(a) shows a modified construction for the element shown in FIG. 6;

FIG. 7 is an end view of the male part of the shelf support system; and,

FIG. 8 is a top view of the male part of the shelf support system.

DETAILED DESCRIPTION

Referring now to the drawings, FIG. 1 illustrates a front view of a display stand unit 10 which incorporates the shelf connector elements 18 and 19 of the present invention. The display stand unit 10 is shown as having at least two shelves 14,15 which include front lip portions 16,17 wherein the male shelf connector elements 19 are attached. The female shelf connector elements 18 are mounted within the side walls 12,13 of the display stand unit 10.

FIG. 2 is a perspective view in cross section of the display unit 10 showing the shelves 14,15 and the orientation of the front lip portions 16,17. For the purpose of illustration only, the shelves 14,15 are shown as being pivotally attached to the rear wall 11 of display unit 10. Thus, as shown in FIGS. 1 and 2, the front of the shelves 14,15 are supported solely by the load bearing elements 18,19 since the sides of shelves 14,15 are not attached in any other way to the side walls 12,13. Obviously, however, in the case where no rear wall 11 was present, both front and rear lips would be required for the shelves and shelf connector elements would be required both front and back. Moreover, it will be understood that the shelf connectors 18,19 could be attached to the side edges of the shelves 14,15 if no front lips 16,17 were provided. For instance, the shelf connectors may be used in either a vertical or horizontal configuration as desired.

FIG. 3 illustrates the method for assembling the display stand unit. Only one side of the display unit is shown since each side may be assembled independently, it being understood that the same technique would be used at each side. For this purpose, the side wall 12 is swung around from rear wall 11 to bring the female connector elements 18 in position. The shelves 14 and 15, which are pivotally attached to rear wall 11, are raised into position to orient the lip portions 16,17 with their male connector elements 19 for engagement with the female elements 18. When these elements are brought adjacent to one another the male elements 19 are simply snapped into the female elements 18 to secure the shelves in position along the side wall 11. A similar action is performed to secure the other ends of the shelves in position.

When it is desired to disassemble, or simply move one or more of the shelves 14,15 out of the way, the elements 18,19 simply slide apart. FIG. 4 illustrates the appropriate action for moving shelf 15 from its engaged position. The front lip portion thereof 17 is lifted upwardly, either independently at each end of shelf 15, or simultaneously at both ends to disengage the male elements 19 from the female connectors 18.

FIG. 5 shows a detailed view of the female connector element 18. It will be seen that the connector element 18 has a base portion 20 and an integral, elongated upraised socket portion 22. The base portion 20 is provided for attaching or anchoring the female connector element 18 within the side wall of a display unit or the like substantially as shown in FIGS. 1-4. It will be noted in this regard that the side wall 12 of display stand unit 10 is of multiple thickness with at least one inner wall 12a and one outer wall 12b. Thus, for anchoring the female connector element 18 in side wall 12, the inner wal 12a thereof is provided with an opening (not shown) that is equal in size and shape to the upraised socket portion 22 of connector element 18. During the manufacture of the display unit the protruding portions 22 of the female connector elements 18 are positioned within the openings provided therefor in the inner wall 12b while the base portions 20 are glued or stapled to the outer wall 12b. In this manner, the female connector elements 18 become securely anchored in place and are ready for use. The protruding socket 22 of each female connector element 18 includes a pair of elongated sides 22a and 22b and an opening 24 at one end between the sides that narrows to a pair of locking ears 26 and an elongated slot 28 in the face 22c thereof that extends substantially the full length of the socket 22. The elonated slot 28 terminates at the other end with a lip portion 28a formed in the face 22c, and has a width and length that is substantially equal to the thickness and height of the elongated, flat flange locking portion 25 of the male connector element 19. The locking ears 26 are slightly closer together than the confronting sides of slot 28 to prevent inadvertent removal of the male element 19 from the female element 18, and the wider opening 24 serves two purposes. First, opening 24 permits the sides 22a and 22b of socket 22 of female connector element 18 to flex when the male element 19 is snapped into slot 28, and it also permits the male element 19 to be slid up and out of female element 18 when the shelves are disassembled.

One embodiment of the male shelf connector element 19 of the present invention is shown in detail in FIGS. 6-8. Connector element 19 is preferably formed from a one piece injection molding with three distinct portions. The one portion 21 is generally rectangular in shape and is sized so as to fit within the lip portions 16,17 of the shelves 14,15 of the exemplary display stand unit disclosed herein. Portion 21 includes a cut out 30 and an extension 29 at one end thereof which are used to secure the connector element within the shelf along its end or edge. The cut out 30 provides a space within which a staple or glue may be placed to secure the element 19 to the shelf. Likewise, the extension 29 allows the male section of the shelf connector to be held in the shelf without stitching or gluing. Another portion of the male connector element 19 is a guard element 23 that is arranged substantially perpendicular to the first portion 21. The function of guard portion 23 is to protect the ends of the shelf lips 16 or 17 during assembly and to limit the distance that the flat, flanged locking portion 25 of male element 19 may be inserted into the female element 18. This locking portion 25 is located beyond the first portion 21 of male connector. In the simplest of terms, the locking portion 25 is substantially an extension of the first portion 21. It is in the shape of a flat flange and it includes a pair of tapered lands or wedges 27 on each side thereof which retain the locking portion 25 of male element 19 within the slotted area 28 of female element 18 when the two are snapped together. The taper of the lands or wedges 27 is such that it will effectively spread the slot 28 open when male element 19 is inserted in female element 18. However, at the same time, the flat rear surfaces or backsides 27a of lands 27 forms a locking means to prevent the male element 19 from being inadvertently pulled directly out of the female element 18. The modified version of the male element 19 shown in FIG. 6(a) provides an additional restraint to keep the elements 18,19 from being inadvertently separated. When the modified version of male element 19 is used, one of the hooked ends 31 or 32 becomes engaged behind the lip portion 28a of the elongated slot 28 of socket 22 to effectively keep the male element 19 from being pulled out of the female element 18. As stated hereinbefore, when disassembly of the connector elements is desired, the male element 19 must be slid up and out of the female element 18 through the opening 24 provided therein.

Basically the present invention is characterized by the establishment of a captured engagement between paired male and female connector elements. The connector elements are fully disclosed and described as being useful as shelf connectors in display stands or the like. However, it will be clear that the connector elements of the invention could readily be employed in other environments where a snap together slide apart cooperation was required or desired. The connector elements of the invention must be distortable, yet rigid and durable to give long life with adequate load bearing strength.

Thus, while the foregoing specification and drawings constitute a description of the improved connector elements in terms to enable one skilled in the art to practice the invention, it will be understood that the invention is susceptible to many modifications and changes within the scope defined in the appended claims.

I claim:

1. A support system for shelving or the like comprising a pair of load bearing members, one of which is attached to a shelf and the other of which is attached to a wall or the like on which said shelf is mounted, said first member comprising a male connector element in the form of an elongated flange with an integral locking means and said second member comprising a female connector element in the form of an elongated socket with an integral slot for accepting said male connector element, wherein said male connector element is adapted to snap into the female connector element for engagement and slide from the female connector element for disengagement, said male connector element further comprises a guard member integral with and spaced from the end of the elongated flange portion and arranged substantially perpendicular thereto, said male connector element further comprises a second integral flange portion that is essentially an extension of the first flange portion that is located on the opposite side of said guard member.

2. The support system of claim 1 wherein the second integral flange portion is substantially rectangular in shape and includes a cut out and an integral, stepped extension at the end thereof for attaching said male connector element to said shelf.

3. The support system of claim 2 wherein the integral locking means of said male connector element comprises a pair of tapered lands arranged on each side of said first flange portion with flattened rear sections for abutting the sides of the integral slot of said female connector element when the two connector elements are engaged.

4. The support system of claim 3 wherein said female connector element further comprises an integral flat base portion located at the rear of said elongated, upraised socket portion and arranged substantially perpendicular thereto for attaching said female connector element to said wall or the like.

5. The support system of claim 4 wherein said female connector element includes an opening at one end of the elongated, upraised socket portion thereof which permits said male and female connector elements to be slid apart for disengagement.

6. The support system of claim 5 wherein the integral slot in the socket portion of said female connector element extends substantially the full length thereof and terminates at one end with a lip portion.

7. The support system of claim 6 wherein the flat flange portion of said male connector element includes a pair of hooked ends, one of which becomes engaged behind the lip portion of the integral slot in the socket portion of said female connector element to prevent said connector elements from being inadvertently separated.

8. The shelf support system of claim 6 wherein said male connector element comprises an elongated, flat flange element with integral locking means, a guard member integral with and spaced from the end of the flange element and a rectangular extension of said flange element on the opposite side of said guard member which is used to attach said male connector element to said shelf.

9. The shelf support system of claim 7 wherein said female connector element comprises a flat base portion which is attached to the side walls of said display stand and an integral upraised socket portion, said socket portion including an integral slot in the face thereof for accepting the flat flange portion of said male connector element and an opening at one end thereof for removing the male connector element from the female connector element.

10. A support system for attaching shelves to a wall or the like comprising a pair of load bearing members, said first member for attachment to a shelf comprising a male connector element in the form of an elongated flange with an integral wedge means and said second member for attachment to said wall comprising a female connector element in the form of an elongated socket having opposed sides, flex means formed in said socket to enable said sides to flex and an integral slot for accepting said male connector element, wherein said male connector element is adapted to wedge said sides and snap in a first direction into locked position within the female connector element and preventing disengagement except by sliding said male connector element from the female connector element in a different direction.

11. The support system of claim 10 including,
an integral locking means positioned on said flange to lock said male connector element.

12. The support system of claim 10 including,
said flex means including an opening between said sides.

13. The support system of claim 10 including,
an integral locking means positioned on said socket to lock said male connector element.

14. The support system of claim 10 including,
an integral locking means positioned on said flange to lock said male connector element,
said flex means including an opening between said sides, and
an integral locking means positioned on said socket to lock said male connector element.

15. The support system of claim 11 including, said integral locking means including rear surfaces of
protruding wedges on said flange.

16. The support system of claim 13 including,
said locking means having opposed ears to narrow said integral slot.

17. The support system of claim 10 including,
an integral locking means positioned on said flange to lock said male connector element,
said integral locking means including rear surfaces of protruding wedges on said flange,
said flex means including an opening between said sides,
an integral locking means positioned on said socket to lock said male connector element, and
said locking means having opposed ears to narrow said integral slot.

18. The support system of claim 10 including,
a support system for shelving or the like comprising a pair of load bearing members, one of which is attached to a shelf and the other of which is attached to a wall or the like on which said shelf is mounted, said first member comprising a male connector element in the form of an elongated flange with an integral locking means and said second member comprising a female connector element in the form of an elongated socket with an integral slot for accepting said male connector element, wherein said male connector element is adapted to snap into the female connector element for engagement and slide from the female connector element for disengagement, said male connector element further comprises a guard member integral with and spaced from the end of the elongated flange portion and arranged substantially perpendicular thereto.

19. The support system of claim 10 including,
a support system for shelving or the like comprising a pair of load bearing members, one of which is attached to a shelf and the other of which is attached to a wall or the like on which said shelf is mounted, said first member comprising a male connector element in the form of an elongated flange with an integral locking means and said second member comprising a female connector element in the form of an elongated socket with an integral slot for accepting said male connector element, wherein said male connector element is adapted to snap into the female connector element for engagement and slide from the female connector element for disengagement, said male connector element further comprises a guard member integral with and spaced from the end of the elongated flange portion and arranged substantially perpendicular thereto, and
said male connector element further comprises a second integral flange portion that is essentially an extension of the first flange portion that is located on the opposite side of said guard member.

20. The support system of claim 10 including,
a support system for shelving or the like comprising a pair of load bearing members, one of which is attached to a shelf and the other of which is attached to a wall or the like on which said shelf is mounted, said first member comprising a male connector element in the form of an elongated flange with an integral locking means and said second member comprising a female connector element in the form of an elongated socket with an integral slot for accepting said male connector element, wherein said male connector element is adapted to snap into the female connector element for engagement and slide from the female connector element for disengagement, said male connector element further comprises a guard member integral with and spaced from the end of the elongated flange portion and arranged substantially perpendicular thereto,
said male connector element further comprises a second integral furnace portion that is essentially an extension of the first flange portion that is located on the opposite side of said guard member, and
the second integral flange portion is substantially rectangular in shape and includes a cut out and an integral, stepped extension at the end thereof for attaching said male connector element to said shelf.

21. The support system of claim 10 including,
a support system for shelving or the like comprising a pair of load bearing members, one of which is attached to a shelf and the other of which is attached to a wall or the like on which said shelf is mounted, said first member comprising a male connector element in the form of an elongated flange with an integral locking means and said second member comprising a female connector element in the form of an elongated socket with an integral slot for accepting said male connector element, wherein said male connector element is adapted to snap into the female connector element for engagement and slide from the female connector element for disengagement, said male connector element further comprises a guard member integral with and spaced from the end of the elongated flange portion and arranged substantially perpendicular thereto,
said male connector element further comprises a second integral flange portion that is essentially an extension of the first flange portion that is located on the opposite side of said guard member,
the second integral flange portion is substantially rectangular in shape and includes a cut out and an integral, stepped extension at the end thereof for attaching said male connector element to said shelf, and
the integral locking means of said male connector element comprises a pair of tapered lands arranged on each side of said first flange portion with flattened rear sections for abutting the sides of the integral slot of said female connector element when the two connector elements are engaged.

22. The support system of claim 10 including,
a support system for shelving or the like comprising a pair of load bering members, one of which is attached to a shelf and the other of which is attached to a wall or the like on which said shelf is mounted, said first member comprising a male connector element in the form of an elongated flange with an integral locking means and said second member comprising a female connector element in the form of an elongated socket with an integral slot for accepting said male connector element, wherein said male connector element is adapted to snap into the female connector element for engagement and slide from the female connector element for disengagement, said male connector element further comprises a guard member integral with and spaced from the end of the elongated flange portion and arranged substantially perpendicular thereto, an integral locking means positioned on said flange to lock said male connector element, and said flex means including an opening between said sides.

23. The support system of claim 10 including, a support system for shelving or the like comprising a pair of load bearing members, one of which is attached to a shelf and the other of which is attached to a wall or the like on which said shelf is mounted, said first member comprising a male connector element in the form of an elongated flange with an integral locking means and said second member comprising a female connector element in the form of an elongated socket with an integral slot for accepting said male connector element, wherein said male connector element is adapted to snap into the female connector element for engagement and slide from the female connector element for disengagement, said male connector element further comprises a guard member integral with and spaced from the end of the elongated flange portion and arranged substantially perpendicular thereto, an integral locking means positioned on said flange to lock said male connector element, said flex means including an opening between said sides, and an integral locking means positioned on said socket to lock said male connector element.

24. The support system of claim 10 including, a support system for shelving or the like comprising a pair of load bearing members, one of which is attached to a shelf and the other of which is attached to a wall or the like on which said shelf is mounted, said first member comprising a male connector element in the form of an elongated flange with an integral locking means and said second member comprising a female connector element in the form of an elongated socket with an integral slot for accepting said male connector element, wherein said male connector element is adapted to snap into the female connector element for engagement and slide from the female connector element for disengagement, said male connector element further comprises a guard member integral with an spaced from the end of the elongated flange portion and arranged substantially perpendicular thereto, an integral locking means positioned on said flange to lock said male connector element, said flex means including an opening between said sides, an integral locking means positioned on said socket to lock said male connector element, and said locking means having opposed ears to narrow said integral slot.

25. The support system of claim 10 including, a support system for shelving or the like comprising a pair of load bearing members, one of which is attached to a shelf and the other of which is attached to a wall or the like on which said shelf is mounted, said first member comprising a male connector element in the form of an elongated flange with an integral locking means and said second member comprising a female connector element in the form of an elongated socket with an integral slot for accepting said male connector element, wherein said male connector element is adapted to snap into the female connector element for engagement and slide from the female connector element for disengagement, said male connector element further comprises a guard member integral with and spaced from the end of the elongated flange portion and arranged substantially perpendicular thereto, said male connector element further comprises a second integral flange portion that is essentially an extension of the first flange portion that is located on the opposite side of said guard member, the second integral flange portion is substantially rectanular in shape and includes a cut out and an integral, stepped extension at the end thereof for attaching said male connector element to said shelf, the integral locking means of said male connector element comprises a pair of tapered lands arranged on each side of said first flange portion with flattened rear sections for abutting the sides of the integral slot of said female connector element when the two connector elements are engaged, an integral locking means positioned on said flange to lock said male connector element, said integral locking means including rear surfaces of protruding wedges on said flange, said flex means including an opening between said sides, an integral locking means positioned on said socket to lock said male connector element, and said locking means having opposed ears to narrow said integral slot.

26. A support system for attaching shelves to a wall or the like comprising a pair of load bearing members, said first member for attachment to a shelf comprising a male connector element in the form of an elongated flange with an integral wedge means and said second member for attachment to said wall comprising a female connector element in the form of an elongated socket, said socket having flexible sides to be operably spread by said wedge means, an integral slot on said socket for accepting said male connector element, locking means operable to prevent selected disengagement, wherein said male connector element is adapted to wedge said sides open to move in a direction perpendicular to said slot to snap into the female connector element for engagement, and wherein said locking means prevents disengagement except by sliding said male connector element from the female connector element in a different direction.

* * * * *